US008842038B2

(12) United States Patent
Edvardsson

(10) Patent No.: US 8,842,038 B2
(45) Date of Patent: Sep. 23, 2014

(54) HIGH FREQUENCY MODE GENERATOR FOR RADAR LEVEL GAUGE

(75) Inventor: Olov Edvardsson, Linköping (SE)

(73) Assignee: Rosemount Tank Radar AB, Gothenburg (SE)

(*) Notice: Subject to any disclaimer, the term of this patent is extended or adjusted under 35 U.S.C. 154(b) by 471 days.

(21) Appl. No.: 12/981,989

(22) Filed: Dec. 30, 2010

(65) Prior Publication Data

US 2012/0169527 A1 Jul. 5, 2012

(51) Int. Cl.
*G01S 13/00* (2006.01)
*G01F 23/284* (2006.01)

(52) U.S. Cl.
CPC ............................ *G01F 23/284* (2013.01)
USPC ........................................................ 342/124

(58) Field of Classification Search
CPC .................................................... G01F 23/284
USPC ........................................................ 342/124
See application file for complete search history.

(56) References Cited

U.S. PATENT DOCUMENTS

| | | | |
|---|---|---|---|
| 4,641,139 A | 2/1987 | Edvardsson | 342/124 |
| 6,415,660 B1 * | 7/2002 | Sinz et al. | 73/290 R |
| 7,345,622 B2 * | 3/2008 | Edvardsson | 342/124 |
| 2007/0085729 A1 * | 4/2007 | Edvardsson | 342/124 |

FOREIGN PATENT DOCUMENTS

| | | |
|---|---|---|
| EP | 0 162 821 A1 | 11/1985 |
| EP | 1870742 A1 * | 12/2007 |
| FR | 1 150 023 A | 1/1958 |
| WO | WO 02/50954 A2 | 6/2002 |

OTHER PUBLICATIONS

Optics-Online.Com, "Plano-convex lens, standard grade", www.optics-online.com/pxs.asp, website version dated Nov. 14, 2002.*
Search Report from PCT Application No. PCT/EP2011/065365, dated Nov. 8, 2011, 3 pgs.
Written Opinion from PCT Application No. PCT/EP2011/065365, dated Nov. 8, 2011, 4 pgs.

* cited by examiner

*Primary Examiner* — Frank J McGue
(74) *Attorney, Agent, or Firm* — Westman, Champlin & Koehler, P.A.

(57) ABSTRACT

A radar level gauging system for determining at least one process variable related to a distance to a surface of a product in a tank comprising transceiver circuitry, processing circuitry, a wave guiding structure arranged guide measurement signals towards the surface, and a radiator connected to the transceiver circuitry and arranged to emit the measurement signal into the wave guiding structure. The system further comprises a mode generator adapted to convert electromagnetic waves emitted from the radiator from a first propagation mode to a second propagation mode, wherein the mode generator includes a lens in the form of a body transparent to electromagnetic waves in the operating frequency range.
With this design, electromagnetic waves having the first propagation mode emitted by the radiator into the lens will be reflected at least twice within the lens (first in the bottom surface and then in the upper surface). At the second reflection (in the upper surface of the lens), the propagation mode will be changed, and the electromagnetic waves exiting the lens will have the second propagation mode.

9 Claims, 3 Drawing Sheets

HIGH FREQUENCY MODE GENERATOR FOR RADAR LEVEL GAUGE

FIELD OF THE INVENTION

The present invention relates to a radar level gauging system of the kind having a wave guiding structure arranged to guide a measurement signal towards a surface in a tank and a high frequency mode generator.

BACKGROUND OF THE INVENTION

Radar level gauge systems for measuring the level of a liquid or other filling materials in a tank are well-known, and such a system generally comprises a transmitter for transmitting a microwave signal towards the surface of the liquid, a receiver for receiving the microwave signal reflected against the surface of the liquid, and a signal processing device for calculating the level of the liquid in the tank from the propagation time of the transmitted and reflected microwave signal. Such device has become more and more important, particularly for petroleum products such as crude oil and products manufactured from it. The tank may be a large container constituting parts of the total loading volume of a tank ship, or even larger usually circular-cylindrical land-based tanks with volumes of tens or thousands of cubic meters.

In some applications the tank may contain interior structures causing disturbing reflections. In other applications, the tank may have a moving roof, adapted to be located close to the surface. In both these situations, it may be advantageous to provide the gauge with a wave guiding structure, typically a so called "still pipe" with a circular cross-section, extending from the antenna into the contents of the tank.

The most suitable propagation mode in such a wave guiding structure is the $H_{01}$ mode. In order to generate electromagnetic radiation in this mode, a circuit board with a patch array feeder may be used. The radiator elements (patches or slots) are fed and shaped to create a circumferential electrical field typical for the $H_{01}$ propagation mode. However, for high frequencies, such a feeder becomes difficult to manufacture due to the extreme tolerances. At the same time, a high frequency band, such as the 26 GHz band, is very suitable for radar level gauging purposes, due to the high accuracy it offers. Also for practical reasons, it is desirable to use the same type of electronics units for applications with still pipes as well as other applications. Consequently, there is s need for an $H_{01}$ mode generator which is easy to adapt to higher frequencies.

It is well known to use optical elements in the design of antennas, and examples include a horn antenna with a lens over its opening and various reflector antennas. Especially pencil-beam antennas for higher frequencies are easier to manufacture using a basically optical design.

One example of a mode generator in a still pipe is shown in U.S. Pat. No. 4,641,139. According to this design, a curved reflecting surface is provided in the cross section of the still pipe, and another curved surface is provided a bit further down. The lower surface is structured with a conducting radial pattern, making it transmissive only to a circumferential mode. The upper surface is structured with a conducting spiral shaped "twist" pattern, where each lead forms a 45 degree angle with a radius. The spiral pattern is backed by a full metallic surface a quarter of a wavelength behind it and the combination will turn a radial field to a circumferential and vice versa. The combination of a twist-reflector and a sheet transparent for one reflection is known as "trans-twist" reflector and used in many reflector antennas for linear polarized waves.

Radial electromagnetic radiation ($E_{01}$-mode) from an annular radiator will be reflected by the lower surface towards the upper surface. At reflection by the upper surface, the spiral pattern will turn the radial $E_{01}$-mode to a $H_{01}$ mode with a circumferential electrical field. The $H_{01}$ beam will now be transmitted by the radial pattern in the lower surface, and be emitted into the tank. The curvature of the surfaces creates a focusing effect upon reflection, ensuring that parallel beams are emitted into the tank throughout the cross section of the pipe.

While providing several advantages, the solution according to U.S. Pat. No. 4,641,139 requires very small scale structuring of the curved surfaces, and especially the thin plastic sheets may be challenging to manufacture. Further, the structural strength of the lower surface may represent a problem, and any movement in this surface will influence the accuracy of the gauge.

GENERAL DISCLOSURE OF THE INVENTION

It is a general object of the present invention to overcome, or at least mitigate the above drawbacks, and to provide a still pipe type radar level gauge with an improved mode generator.

According to an aspect of the present invention, this and other objects are achieved by a radar level gauging system for determining at least one process variable related to a distance to a surface of a product in a tank comprising transceiver circuitry arranged to generate a measurement signal, and to receive a reflected signal, processing circuitry connected to the transceiver circuitry and arranged to determine the process variable based on a relationship between the measurement signal and the reflected signal, a wave guiding structure arranged to guide the measurement signals towards the surface, and to return the reflected signal, and a radiator connected to the transceiver circuitry and arranged to emit the measurement signal into the wave guiding structure as electromagnetic waves in an operating frequency range in a first propagation mode. The system further comprises a mode generator adapted to convert electromagnetic waves emitted from the radiator from a first propagation mode to a second propagation mode, wherein the mode generator includes a lens in the form of a body transparent to electromagnetic waves in the operating frequency range, the lens being arranged in the wave guiding structure and having an optical axis aligned with a center axis of the wave guiding structure. The lens has a bottom surface facing the tank, which is adapted to transmit electromagnetic waves having said second propagation mode and to reflect electromagnetic waves having said first propagation mode, and an upper surface opposite the bottom surface which is adapted to reflect electromagnetic waves and to turn a field of said electromagnetic waves upon reflection, so as to change a propagation mode of said electromagnetic waves from one of said first and second propagation modes to another. The upper surface is transparent to electromagnetic waves in an area facing said radiator.

With this design, electromagnetic waves having the first propagation mode emitted by the radiator into the lens will be reflected at least twice within the lens (first in the bottom surface and then in the upper surface). At the second reflection (in the upper surface of the lens), the propagation mode will be changed, and the electromagnetic waves exiting the lens will have the second propagation mode.

Compared to prior art solutions, where a focusing effect is created by one or two thin PCB:s manufactured non flat by heat forming (poly-ethylene PCB), the lens according to this aspect of the present invention is more stable for sub-mm accuracy, and also makes it easier to avoid undesired reflections. By making the mode generator in the form of a lens, problems with insufficient structural strength are also avoided effectively, especially in the case of a solid lens.

By using an optical element (lens), a focusing effect may be achieved not only by reflection, but also by refraction in a curved transition between mediums with different refraction index. For example, the bottom surface may be convex, and the refraction index of said lens greater than a surrounding medium, so that electromagnetic waves incoming from the tank parallel to the optical axis of the lens are refracted towards the optical axis when entering the lens. The incoming wave is then reflected by the upper surface, and a second time in the bottom surface.

The curvature of the lower surface may be selected such that the combined effect of the refraction and the two reflections creates a focal point where the radiator is arranged. Radiation from the radiator will then be emitted as parallel beams into the tank.

A convex lower surface of the lens is further advantageous for avoiding remaining condensation on this surface.

The proposed design can be made to have a comparatively low profile (small extension in the axial direction of the pipe). In order to make the lens even thinner, the upper side can also be formed as a lens.

However, a substantially flat upper surface is most likely advantageous from a manufacturing perspective. For example, a substantially flat upper surface makes it possible to implement the spiral pattern using a conventional process for printed circuit boards, such as etching. This provides greater flexibility in designing the spiral twist pattern as well as the feeding structure (radiator) in its center.

BRIEF DESCRIPTION OF THE DRAWINGS

The present invention will be described in more detail with reference to the appended drawings, showing currently preferred embodiments of the invention.

DETAILED DESCRIPTION OF PREFERRED EMBODIMENTS

Figure 1:
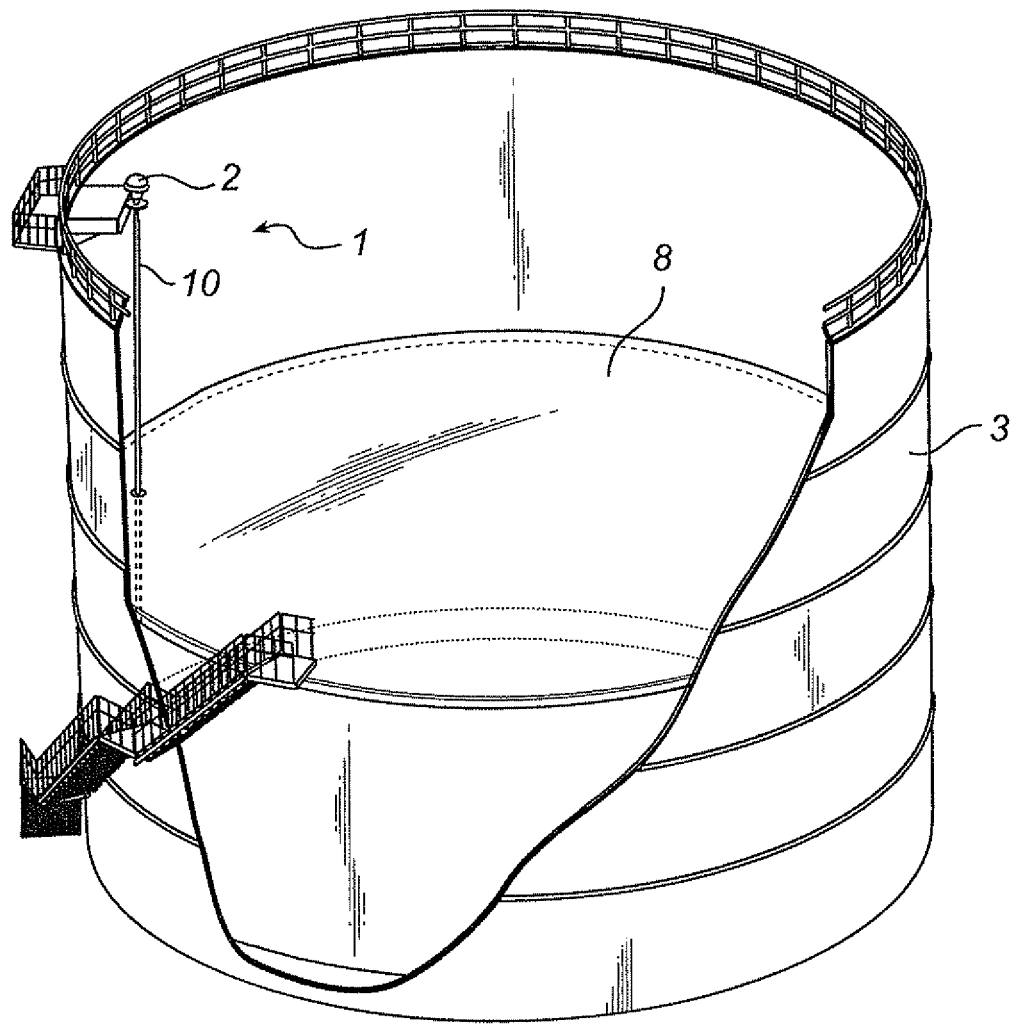
FIG. 1 shows a floating roof tank having a radar level gauge mounted thereon.
Figure 2:
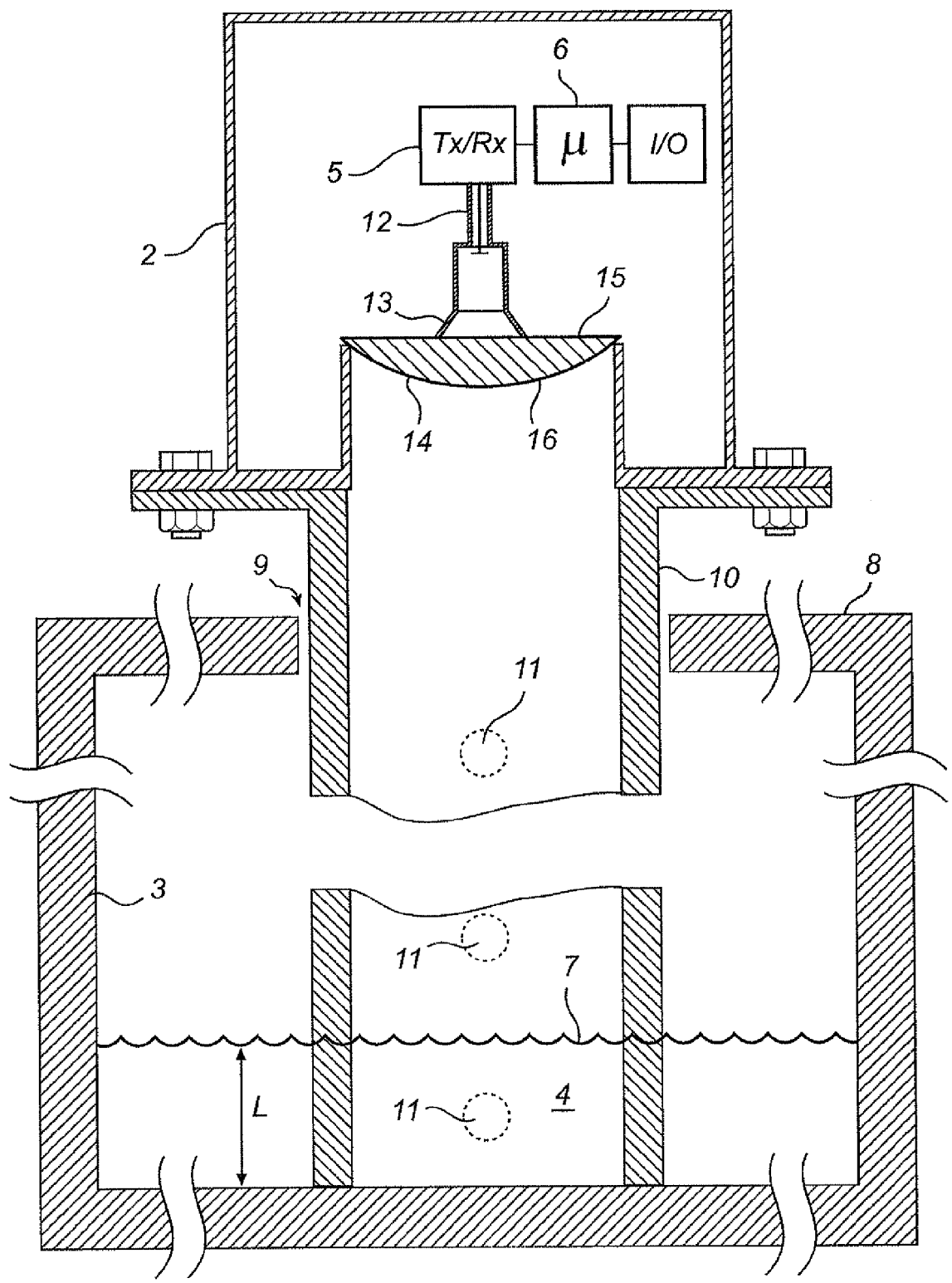
FIG. 2 shows the radar level gauge in more detail.
Figure 3:
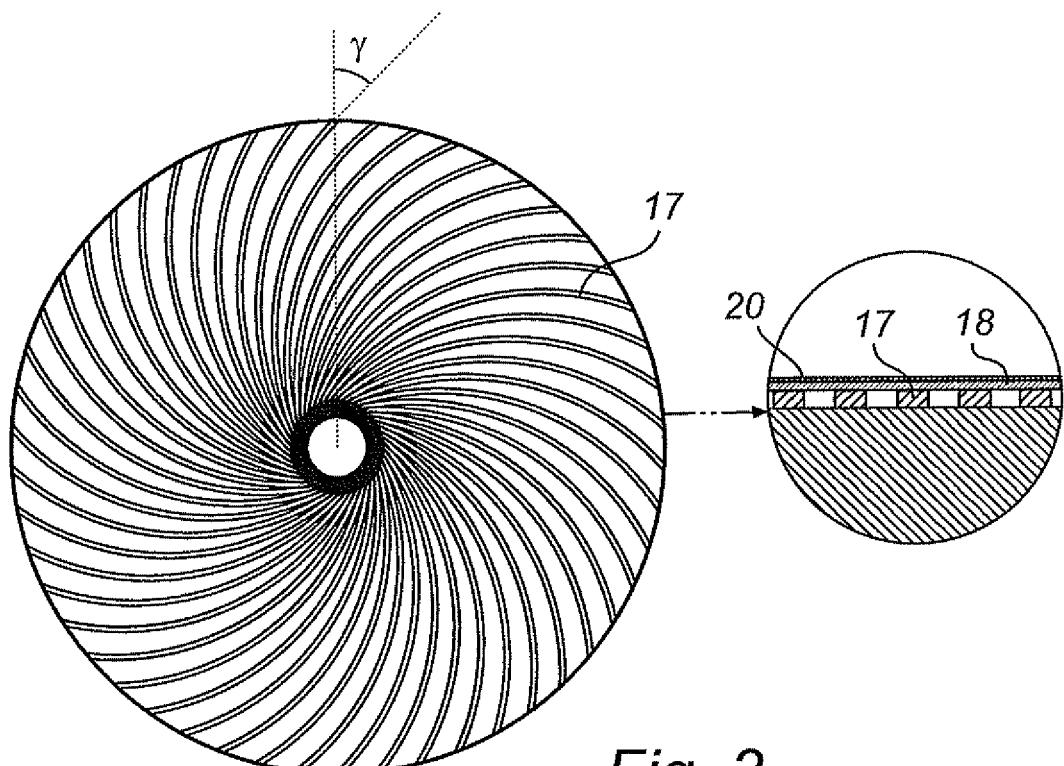
FIG. 3 shows a spiral pattern.
Figure 4:
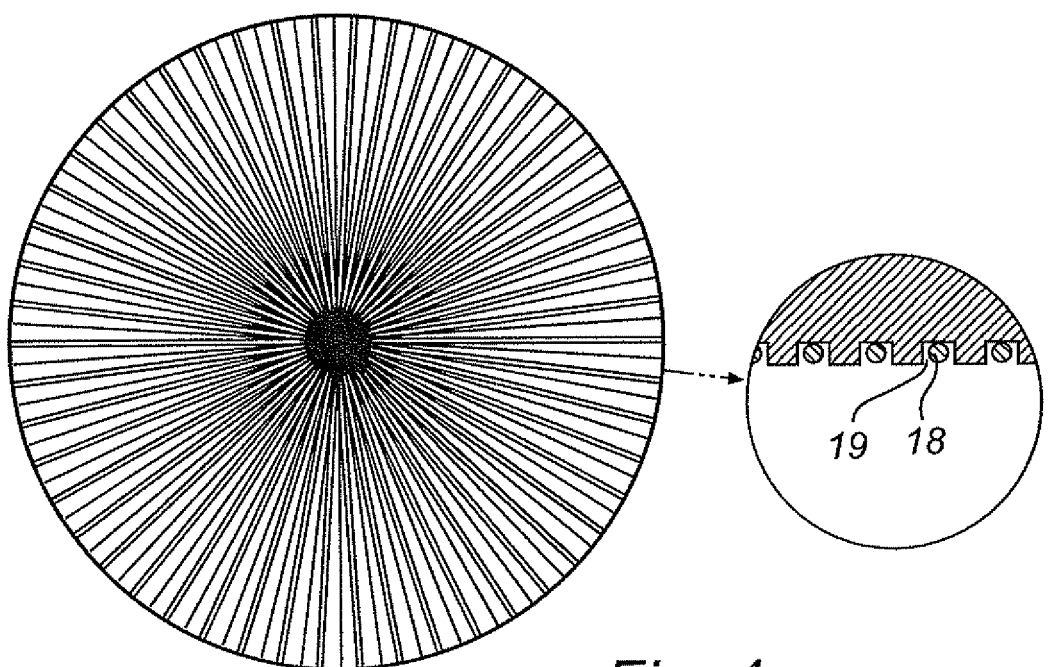
FIG. 4 shows a radial pattern.

FIGS. 1 and 2 shows schematically a radar level gauge (RLG) system 1 according to an embodiment of the present invention. The RLG 1 comprises an electronics unit 2 mounted on a tank 3. The tank contains a liquid 4, which may be a petroleum product, such as crude oil or a product manufactured from it, or a condensed gas, which is stored in the container at overpressure and/or cooled. Propane and butane are two typical gases stored as liquids.

The unit 2 houses a transceiver 5, for transmitting a microwave signal and receiving a reflected microwave signal, and processing circuitry 6 for determining the distance to a reflecting surface 7 (or any other impedance transition) based on the transmitted signal and the reflected signal.

The system may be a frequency modulated continuous wave (FMCW) RLG system or a pulsed RLG system or any other type of distance measuring radar, but is preferably the former. The RLG system may have a capability of transmitting a microwave signal at a variable frequency, which is adjustable.

The RLG further system comprises a waveguide 10, in the form of a substantially vertical tube or tube that is rigidly mounted in the tank 3. The waveguide is here referred to as a still pipe. In the illustrated example, the tank 3 has a floating roof 8, i.e. a cover which is arranged to be supported by the upper surface of the product 4. The still pipe 10 passes through an opening 9 in the floating roof.

The still pipe 10 is preferably of a metallic material to be capable of acting as a waveguide for microwaves and may have an arbitrary cross-sectional shape. A circular cross-section is preferred and in most cases the still pipe is not part of the installation but a part of the existing tank structure. The tube is not shown in its entire length but only in its upper and lower portions. The tube is provided with a number of relatively small openings 11 in its wall, which makes possible the communication of the fluid from the container to the interior of the tube, so that the level of the liquid is the same in the tube as in the container. Experience has shown that by using the H01-mode in a still pipe which has a diameter significantly larger than the wavelength, such holes will have a negligible influence on the wave propagation.

The transceiver 5 comprises a transmitter waveguide 12 connected to a radiator, or feeder 13 by means of a probe 14. The radiator 13 acts as an antenna, to emit electromagnetic waves having a first mode of propagation into the still pipe 10 and receive electromagnetic waves from the pipe 10. The emitted waves are preferably a circular symmetrical radial field, such as the $E_{01}$ mode.

In the illustrated example, the transmitter waveguide 12 is a coaxial cable, and the radiator 13 is a small horn antenna designed for the radial field. A possible design is that the end of a coaxial line is outwards tapered (both centre lead and sleeve), forming an annular shaped opening generating a radial field. The outer diameter of this opening may be in the order of one wavelength in the dielectric material, i.e. around 20 mm in the case of 10 GHz, and around 8 mm in the case of 25 GHz. The radiator may also be a suitable antenna array, creating a circular symmetrical radial field.

The RLG further comprises a mode generator 14, arranged in the still pipe 10 below the radiator 13 and adapted to convert waves in a first propagation mode, emitted from the radiator 13, to waves of a second propagation mode.

According to the illustrated embodiment of the invention, the mode generator is a solid lens 14 extending across the entire still pipe cross section.

The lens 14 here has a flat upper surface 15, facing the radiator, and a convex bottom surface 16. The lens may be made of any material which is transparent to electromagnetic waves in the relevant frequency range, i.e. in the order of 1-100 GHz. As an example, the lens may be made of PTFE but some more petrol-like plastic materials (like polyethene) may also be suitable.

With a flat upper surface, a PTFE lens may become relatively heavy (probably in the order of two kg for a 20 cm pipe). For this reason, it may be advantageous to have a lens which is not homogenous, but made of some artificially dielectric material (i.e. including metal pieces), a solid or liquid material enclosed in a lens shaped enclosure, etc.

The upper surface 15 is adapted to reflect all electromagnetic waves, and to change the propagation mode from the first to the second mode upon reflection. The bottom surface 16 is further adapted to transmit electromagnetic waves having the second propagation mode and to reflect electromagnetic waves having the first propagation mode.

In the illustrated example, the first propagation mode is the $E_{01}$-mode with a circular symmetric E-field in radial direction and the second propagation mode is the $H_{01}$-mode with a circular symmetric E-field in the circumferential direction. The propagation through the still-pipe utilizes only the $H_{01}$-mode but for special reasons $H_{02}$-mode and higher can be used too. In the present disclosure, the terms "first propagation mode" and "second propagation mode" are used not only for steady propagation in a long pipe but also when they are converging or diverging by the curved surfaces.

The mode generator is here arranged to change waves in mode $E_{01}$ (first mode) to mode $H_{01}$ (second mode). The radiator 13 thus emits mode $E_{01}$, which are turned to $H_{01}$ which is more advantageous for propagation through the still pipe 10.

The substantially flat upper surface 15 of the lens is here covered with a conducting pattern formed by one or several spiral leads 17 extending from the center toward the perimeter of the lens. An angle γ between a tangent to the spiral and a radius of the spiral pattern, i.e. a line through the center of the lens in the plane of the spiral, is 45 degrees.

Above the spiral pattern is a full metallic surface 20 (except for the radiator in its centre) at a distance of $\tilde{\lambda}/4$ (in the material) from the spiral. At each small part of the surface electric field parallel to the wires will be reflected by the wires but electric field perpendicular to the wires will be reflected by the full metallic surface. The effect will be that the last field will be phase shifted by 180° and as a result of the spiral pattern a shift between said first and second propagation mode will occur.

This means that incident radiation having a radial propagation mode, such as $H_{01}$, will be turned to a circumferential field, such as $E_{01}$, and vice versa.

Note that the spiral pattern does not cover the central area of the lens, where the radiator is arranged. This allows radiation from the radiator to enter the lens.

According to one embodiment, the pattern on the upper surface of the lens is formed as a printed circuit board (PCB) 18. Preferably, the PCB 18 has a quarter wavelength thickness, and is provided on one side with an annular metallic layer 20, covering the entire PCB except the center (where the radiator 13 is arranged), and on its opposite side a structured metal layer 17 in the form of a spiral pattern (again not covering the center). The PCB 18 with its two metal layers 17, 20 is arranged on the lens with the spiral pattern facing the lens.

The convex bottom surface 16 of the lens is further provided by a conducting pattern in the form of conducting leads 18 extending straight from the center of the surface towards its perimeter. This makes the surface transparent to radiation propagating in $H_{01}$-mode, while reflective to radiation having a radial propagation mode.

The transition between the surrounding medium (e.g. air) and the lens (here of PTFE) will not only cause a refraction, but also a reflection. This reflection may cause interference by appearing as non-wanted modes. For this reason, a quarter wavelength layer of medium dense dielectrical material may be advantageous to provide an anti-reflex function. This layer may be formed by a structured surface, such as quarter wavelength deep grooves, providing a suitable density.

According to one embodiment, the bottom surface has quarter wavelength deep grooves 19 designed as an antireflex-surface and in this case the radial leads 18 can be secured in the grooves. It may be possible to use printed patterns also on the bottom surface.

Due to its shape and its refraction index the lens will have the effect of a beam shaper, so that radiation from the radiator 13 is refracted into parallel beams emitted into the tank. Beams received from the tank will conversely be collected in a focal point of the lens, located at the radiator opening.

The design parameters of the lens are preferably chosen so that a focal point of the lens is located close to the center of the upper flat surface where the radiator 13 is arranged. If it is assumed that the surrounding medium is air, having a permittivity of 1, the effective focal distance F is given by:

$$F = \frac{1}{\frac{2}{R} + \frac{1}{\frac{R\sqrt{eps}}{\sqrt{eps}-1} - 2T}} - T$$

where T is the thickness of the lens, R is the radius of curvature, and eps is the permittivity of the lens material.

If we look for the focus in the middle of the flat surface the parameters should be chosen to give F=O. A positive F means focus above the flat surface. As one example an eight inch pipe may have R=138 mm, T=57 mm for a PTFE lens. Expressed differently, for a PTFE lens, the thickness should be around 26% of the diameter (or more) and the radius of curvature should be around 62% of the diameter. A more elaborate formula is needed if both surfaces are non-flat.

Note that although the formula above permits various combinations of curvature and thickness, it is also required that the lens has sufficient thickness in its perimeter to provide structural strength for it to be supported.

In use, electromagnetic waves in the first propagation mode (here $E_{01}$ mode) will be emitted from the antenna into the lens. These waves will be reflected by the radial pattern of the lower surface of the lens towards the upper surface. When reaching the upper surface, the waves in $E_{01}$ mode will be converted into the second mode (here $H_{01}$ mode) by the spiral pattern, and be reflected back towards the lower surface. This time, the lower surface will be transparent as the waves are in $H_{01}$-mode, and the waves will be emitted into the wave guide. During the reflections, the beam has been refracted to be parallel to the axial extension of the still pipe.

Incoming electromagnetic waves from below, i.e. waves reflected from the interior of the tank, will be converted by the lens in the following manner. An incoming $H_{01}$-mode from the tank will be transmitted through the lower surface of the lens, and refracted towards the optical axis A due to the curvature of the lower surface. Any radiation in other modes will be reflected by the radial pattern in the lower surface. The lens will therefore act as a mode filter for reflected waves.

The transmitted radiation is then reflected by the flat upper surface. At reflection in the upper surface, the spiral pattern turns the polarization of the field, turning the $H_{01}$-mode circumferential field to a radial $E_{01}$ field. Due to the flat shape of the upper surface, the incoming beam continues to approach the optical axis and is incident on the lower surface. As the beam is now in $E_{01}$ mode, it will be totally reflected by the radial structure of the lower surface. After a number of reflections, the beam in $E_{01}$ mode will reach the focal point of the lens, preferably located in the center of the upper surface.

The person skilled in the art realizes that the present invention by no means is limited to the preferred embodiments described above. On the contrary, many modifications and variations are possible within the scope of the appended claims. For example, an annular conical member may be arranged in the still pipe if its diameter does not match the diameter of the lens. This may be advantageous, as it allows one single size of lens be used for still pipes of different diameter.

What is claimed is:

1. A radar level gauging system for determining at least one process variable related to a distance to a surface of a product in a tank comprising:
   transceiver circuitry arranged to generate a measurement signal, and to receive a reflected signal,
   processing circuitry connected to said transceiver circuitry and arranged to determine said process variable based on a relationship between said measurement signal and said reflected signal,
   a wave guide arranged to extend into the product in the tank and to guide said measurement signals towards said surface, and to return said reflected signal,
   a radiator connected to said transceiver circuitry and arranged to emit said measurement signal into said wave guide as electromagnetic waves in an operating frequency range in a first propagation mode, and
   a mode generator adapted to convert electromagnetic waves emitted from said radiator from a first wave guide propagation mode having a radial E-field to a second wave guide propagation mode having a circumferential E-field,
   wherein said mode generator includes a lens in the form of a body transparent to electromagnetic waves in the operating frequency range, said lens being arranged in the wave guide and having an optical axis aligned with a center axis of said wave guide,
   said lens having a bottom surface facing the tank, which is adapted to transmit electromagnetic waves having said second wave guide propagation mode and to reflect electromagnetic waves having said first wave guide propagation mode, wherein said bottom surface is convex, and the refraction index of said lens is greater than a surrounding medium, so that electromagnetic waves incoming from the tank parallel to the optical axis of the lens are refracted towards the optical axis,
   said lens having an upper surface opposite the bottom surface which is adapted to reflect electromagnetic waves and to turn an E-field of said electromagnetic waves upon reflection, so as to change a wave guide propagation mode of said electromagnetic waves from one of said first and second wave guide propagation modes to another,
   said upper surface being transparent to electromagnetic waves in an area facing said radiator.

2. The radar level gauging system according to claim 1, wherein said upper surface is essentially flat.

3. The radar level gauging system according to claim 1, wherein said upper surface is provided with a conducting pattern formed by spirally turning leads, adapted to turn a propagation mode of reflected waves from a circumferential field to a radial field.

4. The radar level gauging system according to claim 3, wherein every tangent to each spiral lead forms an angle of 45 degrees with a radius extending from a center of said conducting pattern.

5. The radar level gauging system according to claim 1, wherein said bottom surface is provided with a conducting pattern of leads extending radially from the optical axis.

6. The radar level gauging system according to claim 1, wherein said lens is solid.

7. The radar level gauging system according to claim 1, wherein said lens is made of PTFE.

8. The radar level gauging system according to claim 1, wherein said lens comprises a liquid material enclosed in a lens shaped enclosure.

9. The radar level gauging system according to claim 1, wherein a focal point of said lens is located close to said radiator arranged in a center of the upper surface.

* * * * *